United States Patent
Iizuka et al.

(10) Patent No.: US 6,596,247 B1
(45) Date of Patent: Jul. 22, 2003

(54) METHOD FOR PURIFYING EXHAUST GAS FROM INTERNAL COMBUSTION ENGINES

(75) Inventors: Hidehiro Iizuka, Hitachinaka (JP); Ryouta Doi, Naka-machi (JP); Hiroshi Hanaoka, Kodaira (JP); Toshio Ogawa, Takahagi (JP); Osamu Kuroda, Hitachi (JP); Hisao Yamashita, Hitachi (JP); Shigeru Azuhata, Hitachi (JP); Yuichi Kitahara, Hitachinaka (JP); Norihiro Shinotsuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/348,272

(22) Filed: Jul. 7, 1999

Related U.S. Application Data

(62) Division of application No. 08/958,673, filed on Oct. 27, 1997, now Pat. No. 5,968,870.

(30) Foreign Application Priority Data

Oct. 25, 1996 (JP) ............................... 8-283672

(51) Int. Cl.$^7$ ........................... B01D 53/56; B01D 53/94

(52) U.S. Cl. ............................... 423/213.2; 423/213.5; 423/239.1

(58) Field of Search .......................... 423/239.1, 213.2, 423/213.5

(56) References Cited

U.S. PATENT DOCUMENTS

| | | | |
|---|---|---|---|
| 4,024,706 A | 5/1977 | Adawi et al. | 60/274 |
| 4,608,360 A * | 8/1986 | Abrevaya et al. | 502/226 |
| 4,780,447 A | 10/1988 | Kim et al. | 502/243 |
| 4,868,148 A | 9/1989 | Henk et al. | 502/303 |
| 5,116,800 A | 5/1992 | Williamson et al. | 502/303 |
| 5,128,305 A * | 7/1992 | Yoshimoto et al. | 502/243 |
| 5,174,111 A | 12/1992 | Nomura et al. | 60/285 |
| 5,189,876 A | 3/1993 | Hirota et al. | 60/286 |
| 5,208,203 A * | 5/1993 | Horiuchi et al. | 502/302 |
| 5,233,830 A | 8/1993 | Takeshima et al. | 60/278 |
| 5,294,421 A * | 3/1994 | Muraki et al. | 423/239.1 |
| 5,331,809 A | 7/1994 | Takeshima et al. | 60/288 |
| 5,338,715 A * | 8/1994 | Iida et al. | 502/64 |
| 5,471,836 A | 12/1995 | Takeshima et al. | 60/297 |
| 5,472,673 A | 12/1995 | Goto et al. | 422/169 |
| 5,595,060 A | 1/1997 | Togai et al. | 60/274 |
| 5,657,625 A | 8/1997 | Koga et al. | 60/274 |
| 5,762,892 A * | 6/1998 | Kasahara et al. | 423/213.5 |
| 5,804,152 A * | 9/1998 | Miyoshi et al. | 423/213.5 |
| 5,817,596 A * | 10/1998 | Akporiaye et al. | 502/327 |
| 5,849,254 A | 12/1998 | Suzuki et al. | 423/213.5 |
| 5,853,679 A * | 12/1998 | Tabata et al. | 423/213.2 |
| 5,922,293 A * | 7/1999 | Miyoshi et al. | 423/213.5 |
| 5,948,376 A * | 9/1999 | Miyoshi et al. | 423/213.5 |
| 5,953,907 A | 9/1999 | Kato et al. | 60/274 |
| 6,017,503 A * | 1/2000 | Kato et al. | 423/235 |
| 6,093,670 A * | 7/2000 | Brown | 502/50 |

FOREIGN PATENT DOCUMENTS

| | | | |
|---|---|---|---|
| EP | 0 272 136 A2 | 6/1988 | |
| EP | 0 335 847 A1 * | 10/1989 | ............ 423/239.1 |
| EP | 0 351 197 A3 | 1/1990 | |
| EP | 0 598 916 A1 | 6/1994 | |
| JP | 61-112715 A | 5/1986 | |
| JP | 62-97630 A | 5/1987 | |
| JP | 62-106826 A | 5/1987 | |
| JP | 62-117620 A | 5/1987 | |
| JP | 63-61708 A | 3/1988 | |
| JP | 1-134020 A | 5/1989 | |
| JP | 3-124909 A | 5/1991 | |
| JP | 3-135417 A | 6/1991 | |
| JP | 4-141219 A | 5/1992 | |
| JP | 5-26080 A | 2/1993 | |
| JP | 5-133260 A | 5/1993 | |
| JP | 5-149130 A | 6/1993 | |
| JP | 5-231138 A | 9/1993 | |
| JP | 6-31139 A * | 2/1994 | |
| JP | 7-103012 A | 4/1995 | |
| JP | 7-103015 A | 4/1995 | |
| JP | 7-103016 A | 4/1995 | |
| JP | 7-103033 A | 4/1995 | |
| JP | 8-24643 A * | 1/1996 | |
| JP | 8-121147 A | 5/1996 | |
| JP | 8-200049 A | 8/1996 | |

OTHER PUBLICATIONS

"Development of NOx Storage–Reduction 3–Way Catalyst System", 1994 Kenji Katoh et al, pps. 41–44, Preprints of Society of Automotive Engineers of Japan, 946 1994–10.

"Development of a lean burn system having a NOx storate–reducing type three–way catalyst", 1995, pps. 60–63, The Promotion of Machine Industry, vol. 28, No. 12.

"Developments of an NOx storage–reduction 3–way catalyst system", Kenji Katoh et al, 1996 pps 68–73, Automobile Technical Papers, vol. 27, No. 1, Jan. 1996.

"Development of NOx storage–reduction 3–way catalyst system", Tanaka et al, 1995, pps 34–38, Automobile Technical Papers, vol. 26, No. 4, Oct., 1995.

"Development of NOx Storage–Reduction 3–way Catalyst System (II)—NOx Reduction Mechanism and Improvement of Conversion Efficiency" Tanaka et al, 1994, pps. 45–48, Preprints of Society of Automotive Engineers of Japan, 946 1994–10.

(List continued on next page.)

Primary Examiner—Stanley S. Silverman
Assistant Examiner—Timothy C Vanoy
(74) Attorney, Agent, or Firm—Crowell & Moring LLP

(57) ABSTRACT

A catalyst being formed of a porous supporter supporting alkali metals, Ti and noble metal, or further supporting at least one of rare earth metal and magnesium, being disposed in a flow passage of the internal combustion engine, and being used to purify NOx contained in the exaust gas. The above catalyst has excellent $NO_x$ resistance not only to the exaust gas burnt with the stoichiometric air-to-fuel ratio or rich condition, but to the exhaust gas burnt with the lean condition, and furthermore has a high resistivity to poisoning of SOx slightly contained in the fuel.

8 Claims, 4 Drawing Sheets

OTHER PUBLICATIONS

"Lean–burn engine—7A–FE model", 1995 pps 180–193, Automotive Engineering, vol. 44, No. 7.

"Aspects of Automotive Catalyst Preparation, Performance and Durability", B.J. Cooper et al, 1987 pps. 117–123 Cat. and Auto. Poll. Control.

"Honda Develops New Engine That Offers High Fuel Efficiency and Excellent Performance" Honda Press Information Jul. 30, 1991 pps 1–19, Ref. No. 91011.

Toyota Press Information, Nov. 25, 1993, "Toyota Uses New Concept To Develop Three–Way Catalyst For Lean–Burn Engines", 3 pages.

"Development of a nitrogen oxides occlusion type catalyst for lean combustion engines of automobiles" Petrotech, 1996, pps 472–476.

SAE Technical Paper Series—950809 "Development of New Concept Three–Way Catalyst for Automotive Lean–Burn Engines" Miyoshi et al, 1995, pps. 121–130.

Catalysis Today 29, "DeNOx catalyst for automotive lean-burn engine" Matsumoto, 1996, pps 43–44.

Catalysis Today 27, The new concept 3–way catalyst for automotive lean–burn engine: NOx storage and reduction catalyst, Takahashi et al, 1996, pps 63–69.

JSAE Preprint 946—1994 "Development of NOx Storage Reduction Three–Way Catalyst System (Part 1)" Katoh et al, pps.1–11.

Ind. eng. Chem. Prod. Res. Dev. Mar. 1983, vol. 22, No. 1, "Behavior of Automobile Exhaust Catalysts with Cycled Feedstreams" Taylor et al, pps 45–51.

JSAE Technical Series 882072–882166, "Dynamic Behavior Analysis of Three Way Catalytic Reaction" Yamamoto et al, 1988, pps. 1–10.

SAE Technical Pape Series 881585—"Engineered Control Strategies for Improved Catalytic Control of NOx in Lean Burn Applications"—Diwell et al—Oct. 10–13, 1988, pps. 1–10.

SAE Technical Paper Series 780607—"Effect of Air=Fuel Ratio Modulation on Conversion Efficiency of Three–Way Catalysts"—Kaneko et al, pps. 119–127—1988.

* cited by examiner

CLEANING RATIO FOR NOx :
BELOW 80 %
ABOVE 80 %
ABOVE 90 %

METHOD FOR PURIFYING EXHAUST GAS FROM INTERNAL COMBUSTION ENGINES

This application is a division of application Ser. No. 08/958,673, filed Oct. 27, 1997, now U.S. Pat. No. 5,968,870.

BACKGROUND OF THE INVENTION

This application claims the priority of Japanese Application No. 8-283672, filed Oct. 25, 1996, the disclosure of which is expressly incorporated by reference herein.

The present invention relates to a catalyst for removing nitrogen oxide contained in an exhaust gas from an internal combustion engine such as a vehicle engine, and to a method of efficiently removing nitrogen oxide from the exhaust gas.

The catalyst in accordance with the present invention has a high performance of removing nitrogen oxide from an exhaust gas containing oxygen burned under a lean condition as well as an exhaust gas burned under a condition of stoichiometric air-to-fuel ratio (A/F=about 14.7), has heat resistance, $SO_x$ poison resistance, and is suitable for cleaning an exhaust gas exhausted from a lean-burn engine.

In the recent trend of natural resource saving and environmental protection, there is a social need to operate a gasoline engine for a vehicle under lean-burn conditions. In connection with this trend, there has been progress to develop a catalyst (lean $NO_x$ catalyst) which can effectively remove nitrogen oxide ($NO_x$) in an exhaust gas containing oxygen from a lean-burn engine.

In regard to exhaust gas cleaning catalysts for lean-burn engines, there is reported a catalyst supporting an alkali metal oxide and platinum on a porous supporter, for example, such catalyst is shown in Japanese Patent Application Laid-Open No. 6-31139.

Furthermore in Japanese Patent Application Laid-Open No. 8-24643, a catalyst supporting at least one kind of palladium, rhodium and platinum, and at least one of alkali metal, alkali earth metal and rare earth metal, on the porous supporter. Here, as an embodiment of the catalyst material, one catalyst contains at least one kind of palladium, rhodium and platinum, and cerium and barium, and another catalyst contains them and further supporting La, Zr, Li, K, Mg, etc. thereon.

SUMMARY OF THE INVENTION

As environmental restrictions to vehicles are growing severer, a lean $NO_x$ catalyst is required to have a higher $NO_x$ cleaning performance, and at the same time required to endure temperature changes of burned exhaust gas accompanied by various change of vehicle speed and small amounts of catalyst poisoning components ($SO_x$, P, Pb etc.) contained in the exhaust.

In order to solve the above-mentioned technical problems, an object of the present invention is to provide a catalyst having a high $NO_x$ cleaning performance and excellent heat resistance and poison resistance to the catalyst poisoning components in the exhaust. Another object of the present invention is to provide a method for cleaning the exhaust gas by using the catalyst.

A catalyst as in the present invention supports alkali metals, titanium and noble metals on the surface of a porous supporter composed of inorganic oxide.

As the noble metal, it is preferable to contain at least one of rhodium (Rh), platinum (Pt) and palladium (Pd), and especially it is preferable to contain rhodium and at least one of platinum (Pt) and palladium (Pd).

As the alkali metal, it is preferable to contain at least one of sodium, lithium, potassium and rubidium.

The catalyst in the present invention is capable of containing one or both of a rare earth metal and magnesium other than the alkali metal, titanium and noble metal.

The rare earth metal is preferably selected from at least one among lanthanum and cerium.

Support amounts of alkali metal, titanium, noble metal, and rare earth metal are preferably to be the following weight % of metallic element to porous supporter of 100 weight %: Alkali metal is 2.5 to 27 weight %, titanium is 1 to 8 weight %, rhodium in noble metal is 0.05 to 0.3 weight %, platinum is 0.5 to 3 weight %, palladium is 0.5 to 15 weight %, and rare earth metal is 5 to 30 weight %.

Moreover, the support amount of magnesium is preferably 1 to 40% as a weight ratio of the magnesium support amount to support amounts of alkali metal and magnesium.

As the supporter, alumina, titania, silica, magnesia, mixture of silica and aluminum, and various kind of multiple oxide may be used. Especially, almina or multiple oxide of lanthanum and aluminum are desirable. It is preferable for the multiple oxide of lanthanum and aluminum to consist of lanthanum 1 to 20 mole % in mole ratio and aluminum as a remainder.

It is desirable for the porous supporter to be coated on a honeycomb substrate.

In the catalyst of the present invention, the porous supporter is supported with Ce first, Mg, Na and Ti next, with Pt and Rh, and finally with Mg again.

The catalyst in the present invention is arranged in an exhaust gas passage of the engine, and $NO_x$ which is contained in the burnt exhaust, when the air-fuel ratio is lean is reduced so as to be removed by reacting with carbon monoxide or a hydrocarbon.

The reason the catalyst in the present invention has a high purification capacity for $NO_x$ is that a high affinity for $NO_x$ is created by Ti coexisting with alkali metal $NO_x$ is adsorbed on a surface thereof, and the adsorbed $NO_x$ is reduced by a coexisting with noble metal.

$NO_x$ purification of lean exhaust deteriorates progressively while the catalyst is continuously used for a long time. This is because oxygen is in the lean exhaust and carbon monoxide or hydrocarbon as a reducer for $NO_x$ is oxidized. Accordingly, it is preferable to change into a rich condition for several seconds to several minutes, and to return to the lean condition again. Thus, the nitrogen oxide purification rate is measured and if the measured value falls below a set point, it is preferable to change. Moreover, it is preferable to measure the $NO_x$ concentration in the exhaust and to drive it in a fixed time by changing the burning condition of the engine into the theoretical air-fuel ratio or the rich condition if the measured value falls than the set point.

Methods of preparing the catalyst applicable are physical preparation methods such as an impregnation method, a kneading method, a coprecipitation method, a sol-gel method, an ion-exchange method, a vapor-deposition method and so on and chemical preparation methods utilizing chemical reaction.

Starting raw materials for catalyst preparation are various chemical compounds such as nitrides, acetates, chlorides, sulfates, carbonates, organic compounds of alkali metals, Mg, earth metals, noble metals; sol of metal oxides deflocculated by an acid or a base; metals and metal oxides; and so on. In the same way, relating to the starting raw materials for the Ti, the various chemical compounds and sol may be used. As sol of metal oxide, acid titanina such as sol of titanium nitride and sol of basic titanina may be used. In a case of using a mixed sol of an acid titanina and an acid alkali metal solution, the starting raw materials are preferable because particles of titania having poison resistance to sulfur oxides ($SO_x$) attached with particles of alkali metal oxide on the surface are supported by a porous supporter.

The catalyst in accordance with the present invention has a high cleaning capability not only for $NO_x$ but for hydrocarbons. However, in order to attain a higher cleaning capability for hydrocarbons, it is effective to dispose a hydrocarbon burning catalyst with the catalyst of the present invention in a flow passage of the exhaust gas. In regard to combining methods, it is preferable to place the hydrocarbon burning catalyst in the rear stage of the exhaust gas cleaning catalyst. As the hydrocarbon burning catalyst, a three way catalyst or a catalyst containing Pd as the noble metal may be used.

A small amount of sulfur oxides poison catalyst active components, particularly, alkali metals. In the present invention, absorbing sulfur oxides to alkali metal is suppressed by Ti having poison resistance to sulfur oxides.

Further, it is also estimated that in a reductive environment, reduction and detachment of the absorbed sulfur oxides occur through the noble metal adjacent to the alkali metal. Therefore, even if performance of the catalyst in accordance with the present invention is temporarily deteriorated by sulfur oxides, the sulfur oxides can be removed and the catalyst can be reactivated by heating the catalyst to 400° C. to 800° C. under the reductive environment, that is, using the burned exhaust gas below stoichiometric air-to-fuel ratio.

The catalyst in accordance with the present invention can show an effect in treatment of exhaust gas. The diesel engine is operated under an oxygen rich condition of high air-to-fuel ratio. Since the catalyst in accordance with the present invention can show excellent activity even under an oxygen containing condition, the catalyst can clean the exhaust gas ejected from the diesel engine by effectively removing nitrogen oxides.

The catalyst in accordance with the present invention has good activity within the temperature range above 200° C. and below 600° C., and, particularly, has high activity within the temperature range of 250° C. to 500° C. Therefore, it is preferable that the temperature under which the catalyst and the exhaust gas are brought in contact with each other, that is, the so-called reaction gas temperature is set to a temperature within the above-mentioned range.

DETAILED DESCRIPTION OF THE PREFERRED EMBODIMENTS

Figure 1:
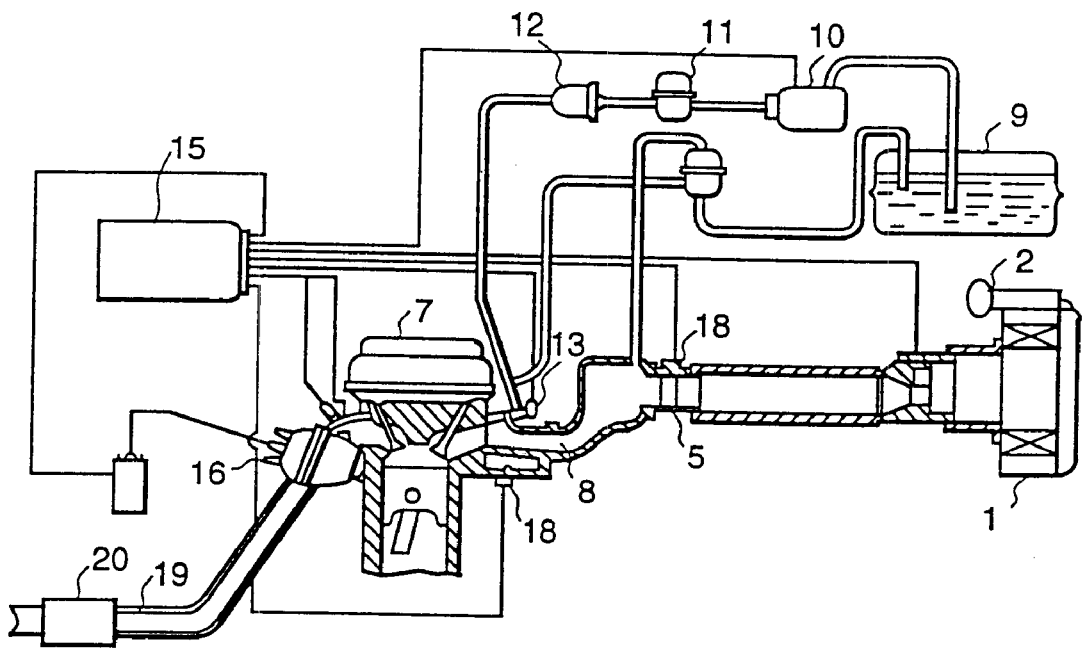
FIG. 1 is a conceptual view showing a gasoline engine for vehicle of a fuel injection type.

FIG. 1 is a conceptual view showing a gasoline engine for a vehicle of a fuel injection type.

Air mixed with gasoline in an intake pipe 8 is burned in a cylinder by electrical ignition. Exhaust gas generated by combustion is ejected out of the system through an exhaust pipe 19 and an exhaust gas cleaning catalyst 20 is downstream. By controlling a fuel injection valve 13 and an ignition unit by a control unit 15, the combustion condition in the cylinder is controlled to any one of desired conditions of a stoichiometric air-to-fuel ratio (stoichiometric), a fuel excessive condition (rich) and an air excessive condition (lean).

Therein, since the exhaust gas exhausted from the engine 7 contains harmful components such as HC, CO, $NO_x$ and the like, the exhaust gas must be ejected out of the system after the harmful components are detoxified.

Therefore, the exhaust gas cleaning catalyst 20 for cleaning the exhaust gas using catalytic function is provided in the exhaust pipe 19. Since the catalyst in accordance with the present invention can clean a lean exhaust gas in addition to conventional cleaning of burned exhaust gas in stoichiometric and rich conditions, the combustion condition of the combustion system in FIG. 1 can be arbitrarily set. Further, by improving the heat resistance and the $SO_x$ poison resistance, the combustion system of FIG. 1 can be stably operated. As for the reference characters in FIG. 1, 1 is an air cleaner, 2 is an intake port, 5 is a throttle valve, 9 is a fuel tank, 10 is a fuel pump, 11 is a fuel damper, 12 is a fuel filter, 16 is a distributor and 18 is throttle sensor.

Embodiment of the present invention will be described below. However, the present invention is not limited by these embodiments.

An alumina coated honeycomb having alumina coating of nearly 160 g per apparent volume of honeycomb of 1 liter was obtained by coating a slurry, which was formed of alumina powder, aluminum nitrate and aluminum hydroxide, and prepared in nitric acid, to a honeycomb (400 cells/in$^2$) made of cordierite, and then by drying and baking the alumina coated honeycomb. The alumina coated honeycomb was impregnated with Ce nitrate solution, and then dried at 200° C. and baked at 700° C. for 1 hour. Then, the alumina coated honeycomb was impregnated with a mixed solution of Na nitrate and Mg nitrate and nitric acid titania sol, and dried and baked in the same condition as above. Further, the alumina coated honeycomb was impregnated with a mixed solution of dinitro-diamine Pt nitrate solution and Rh nitrate solution, and then dried at 200° C. and baked at 450° C. for 1 hour. Finally, the alumina coated honeycomb was impregnated with Mg nitrate solution, and dried at 200° C. and baked at 450° C. for 1 hour, and then baked at 700° C. for 5 hours. Through the methods described above, a catalyst was obtained of Embodiment 1 which was supported with Ce of 18 weight %, Na of 12 weight %, Mg of 1.2 weight %, Ti of 2.5 weight %, and then supported with Pt of 1.6 weight % and Rh of 0.15 weight %, and finally supported with Mg of 1.5 weight % to alumina 100 weight %.

Through the same method conditioned above, embodiments 2 to 6 are obtained. Furthermore, catalyst 1 which does not contain Ti was obtained by the same catalyst preparation method as that of the catalyst of Embodiment 1.

Compositions of the prepared catalysts are shown in Table 1. The item "Order of supporting" active components in each of the catalysts in Table 1 indicates that the "first component" is supported, and next the "second component" is supported, and then the "third component is supported, and follows successively. Support amount is indicated before kind of supported metal. The word "wt." in the table means weight %.

TABLE 1

| | Order of Supporting | | | |
|---|---|---|---|---|
| | 1st Component | 2nd Component | 3rd Component | 4th Component |
| Catalyst Embodiment 1 | 18 wt. Ce | 12 wt % Na<br>1.2 wt % Mg<br>2.5 wt % Ti | 0.15 wt % Rh<br>1.6 wt % Pt | 1.5 wt % Mg |
| Catalyst Embodiment 2 | 18 wt. La | 12 wt % Na<br>1.2 wt % Mg<br>2.5 wt % Ti | 0.15 wt % Rh<br>1.6 wt % Pt | |
| Catalyst Embodiment 3 | 18 wt. Ce | 12 wt % K<br>1.2 wt % Mg<br>2.5 wt % Ti | 0.15 wt % Rh<br>1.6 wt % Pt | |
| Catalyst Embodiment 4 | 18 wt. Ce | 12 wt % Li<br>1.2 wt % Mg<br>2.5 wt % Ti | 0.15 wt % Rh<br>1.6 wt % Pt | |
| Catalyst Embodiment 5 | 18 wt. Ce | 12 wt % Na<br>1.2 wt % Mg<br>2.5 wt % Ti | 0.15 wt % Rh<br>1.6 wt % Pt<br>1.6 wt % Pd | None |
| Catalyst Embodiment 6 | 12 wt Na<br>2.5 wt % Ti | 1.6 wt % Rh<br>1.6 wt % Pt | None | |
| Catalyst Embodiment 1 | 18 wt % Ce | 7 wt % Na | 0.15 wt % Rh<br>1.6 wt % Pt | |

TEST EXAMPLE 1

Cleaning performances for nitrogen oxides of the catalysts Embodiments 1 to 6 and the catalyst Comparison 1 were evaluated by the following test method.

TEST METHOD (1) A honeycomb-shaped catalyst (17 mm square×21 mm length) is filled into a pyrex reaction tube.

(2) The reaction tube is put into a ring-shaped electric furnace to heat up to 300° C. or 400° C. Gas temperature at an inlet of the honeycomb is measured. When the temperature reaches 300° C. or 400° C. and is stabilized, a stoichiometric burned model exhaust gas (hereinafter referred to as "stoichiometric exhaust model gas"), to be described later, is started to flow. Three minutes after starting to flow, the stoichiometric model exhaust gas is stopped to flow, and a lean-burn model exhaust gas (herein after referred to as "lean model exhaust gas"), to be described later, is started to flow. $NO_x$ in the gas ejected out of the reaction tube is measured by chemical luminescence method. The $NO_x$ cleaning performance at that time is defined as an initial performance.

The stoichiometric model exhaust gas used was a gas which was composed of NO of 0.1 vol.% (volume %), $C_3H_6$ of 0.06 vol., CO of 0.6 vol., $O_2$ of 0.6 vol., $H_2$ of 0.3 vol., water vapor of 10 Vol., and nitrogen of the remainder. The lean model exhaust gas used was a gas which was composed of NO of 0.06 vol., $C_3H_6$ of 0.05 vol., CO of 0.1 vol., $CO_2$ of 10 vol., $O_2$ of 5 vol., water vapor of 10 vol., and nitrogen of the remainder. Further, a poisoning gas used was a gas which was composed of NO of 0.1 vol., $C_3H_6$ of 0.05 vol., CO of 0.6 vol., $O_2$ of 0.6 vol., $SO_2$ of 0.005 vol., water vapor of 10 vol., and nitrogen of the remainder. Space speed of each of the above-mentioned gases was set to 30,000/h on a dry gas base (not including water vapor).

(3) The reaction tube filled with the honeycomb used in the above item (2) is put into the ring-shaped electric furnace to be heated up to 300° C. Gas temperature at an inlet of the honeycomb is measured. When the temperature reaches 300° C. and is stabilized, the stoichiometric model exhaust gas containing $SO_2$ (hereinafter referred to as "poisoning gas") is started to flow. $SO_2$ poisoning is completed by flowing the poisoning gas for 5 hours. Using the honeycomb-shaped catalyst after $SO_2$ poisoning, an $NO_x$ cleaning performance after $SO_2$ poisoning is obtained through the same test as in the above item (2).

(4) The honeycomb used in the above item (2) is put into a baking furnace to be heated up to 800° C. for 5 hours under air environment. After cooling, an $NO_x$ cleaning performance is measured through the same manner as in the above item (2)

Table 2 shows $NO_x$ cleaning ratio for initial performance and $NO_x$ cleaning ratio of honeycomb-shaped catalyst after $SO_2$ poisoning at a time one minute after switching from stoichiometric model exhaust gas to lean model exhaust gas. The $NO_x$ cleaning ratio is calculated according to the following equation.

($NO_x$ cleaning ratio)=[{($NO_x$ concentration in inlet gas)−($NO_x$ concentration in outlet gas)}÷($NO_x$ concentration in inlet gas)]×100   (1)

The catalysts of Embodiments 1 to 5 had higher initial performances compared to the catalyst of Comparison, and had heat resistance and $SO_2$ resistance.

TABLE 2

| | Initial $NO_x$ cleaning ratio [%] | | $NO_x$ cleaning ratio after $SO_2$ poisoning [%] | | $NO_x$ cleaning ratio after 800° C. baking [%] | |
|---|---|---|---|---|---|---|
| | 300° C. | 400° C. | 300° C. | 400° C. | 300° C. | 400° C. |
| Catalyst Embodiment 1 | 95 | 97 | 86 | 89 | 68 | 65 |
| Catalyst Embodiment 2 | 92 | 90 | 90 | 87 | 65 | 60 |
| Catalyst Embodiment 3 | 90 | 92 | 80 | 84 | 62 | 60 |
| Catalyst Embodiment 4 | 80 | 82 | 72 | 70 | 58 | 50 |
| Catalyst Embodiment 5 | 95 | 92 | 82 | 83 | 62 | 60 |
| Catalyst Embodiment 6 | 90 | 92 | 75 | 70 | 55 | 50 |
| Catalyst Embodiment 1 | 90 | 75 | 40 | 30 | 30 | 155 |

A catalyst of Embodiment 6 was obtained from a complex oxide of La and Al (La—B—$Al_2O_3$) by changing composition ratio of La and Al in the supporter of the catalyst of Embodiment 1 to La of 5 mol % and Al of 95 mol % on a metallic element base. A method of preparing the catalyst was the same as that in the catalyst of Embodiment 1, and the test method was also the same as that of Test Example 1. Hereinafter, the method of evaluating a catalyst is the same as the method of Test Example 1 if not particularly described.

The result of the catalyst of Embodiment 6 is shown in Table 3 together with the result of the catalyst of Embodiment 1 described previously.

By employing heat resistant ($La—B—Al_2O_3$) to the supporter, the heat resistance and $SO_x$ resistance are improved.

TABLE 3

|  | Initial $NO_x$ cleaning ratio [%] | | $NO_x$ cleaning ratio after $SO_2$ poisoning [%] | | $NO_x$ cleaning ratio after 800° C. baking [%] | |
| --- | --- | --- | --- | --- | --- | --- |
|  | 300° C. | 400° C. | 300° C. | 400° C. | 300° C. | 400° C. |
| Catalyst Embodiment 1 | 95 | 97 | 86 | 89 | 68 | 65 |
| Catalyst Embodiment 6 | 94 | 97 | 95 | 96 | 72 | 70 |

Figure 2:
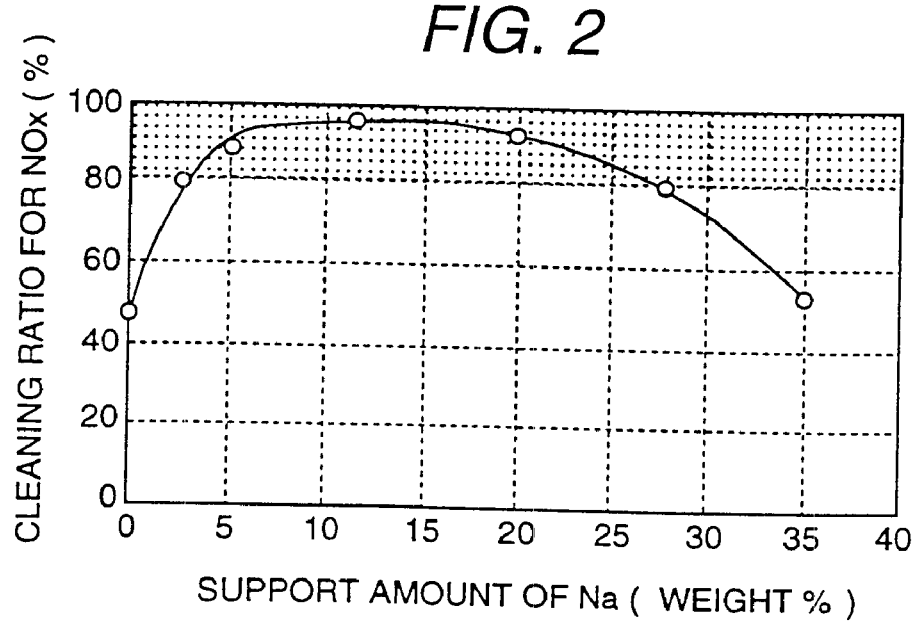
FIG. 2 is a graph showing the relationship between support amount of Na and cleaning ratio for $NO_x$.

An initial performance of $NO_x$ cleaning ratio at 400° C. was measured for catalysts in which a support amount of Na of the second component was changed in the catalyst of Embodiment 1. The result is shown in FIG. 2. A high $NO_x$ cleaning ratio can be attained by setting the supporting amount of Na to 2.5 to 27 weight % on a base of supporter of 100 weight %.

Figure 3:
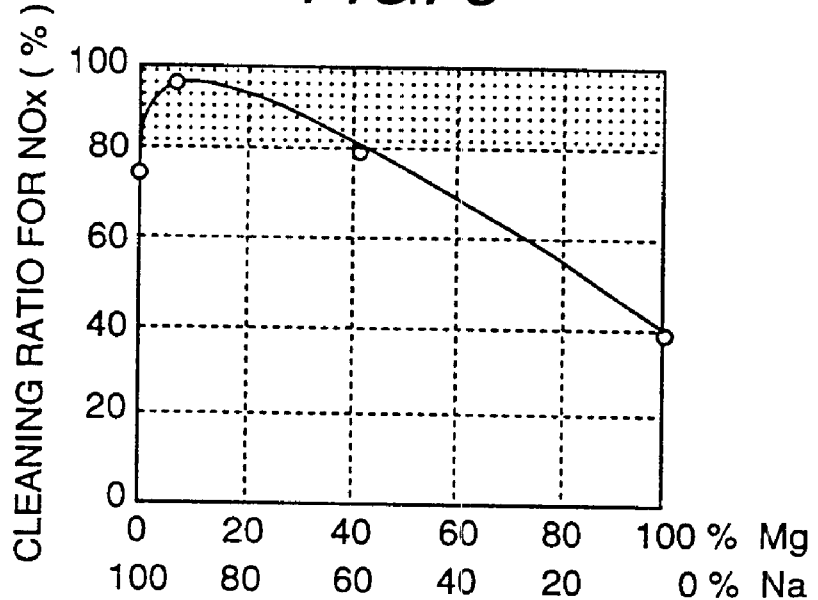
FIG. 3 is a graph showing the relationship between support amounts of Mg, Na and cleaning ratio for $NO_x$.

An initial performance of $NO_x$ cleaning ratio at 400° C. is measured for catalysts in which the weight % between a support amount of Mg of the second component and a support amount of Na is changed in the catalyst of Embodiment 1. The result is shown in FIG. 3. In order to attain a high $NO_x$ cleaning ratio, it is preferable that the weight ratio of (supporting amount of Mg)/{(supporting amount of Na)+ (supporting amount of Mg)} is set to 1 to 40 weight %.

Figure 4:
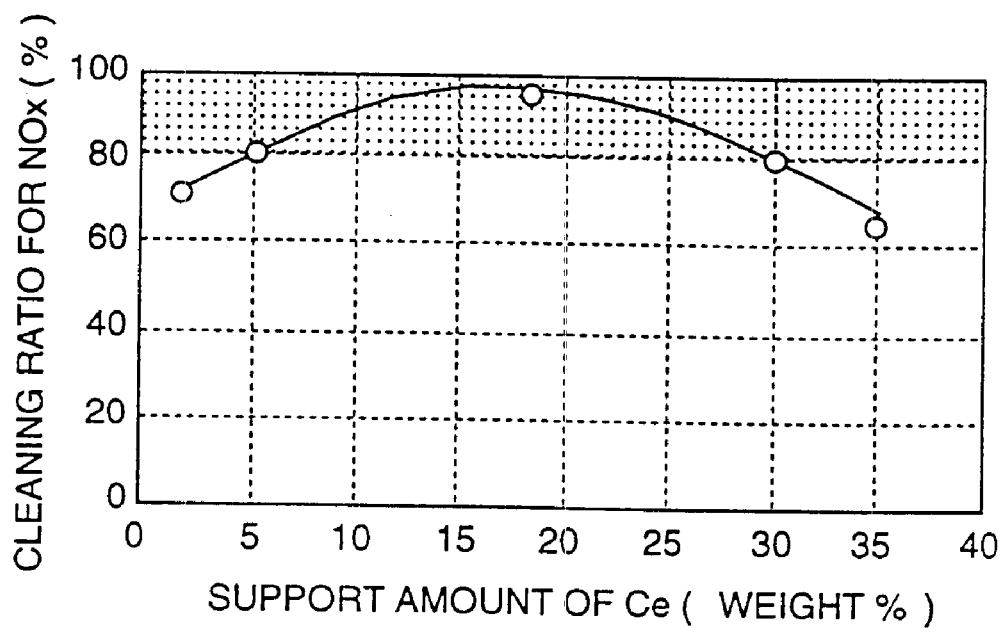
FIG. 4 is a graph showing the relationship between support amount of Ce and cleaning ratio for $NO_x$.

An initial performance of $NO_x$ cleaning ratio at 400° C. was measured for catalysts in which a support amount of Ce of the first component was changed in the catalyst of Embodiment 1. The result is shown in FIG. 4. A high $NO_x$ cleaning ratio can be attained by setting the supporting amount of Ce to 1 to 40 weight %.

Figure 5:
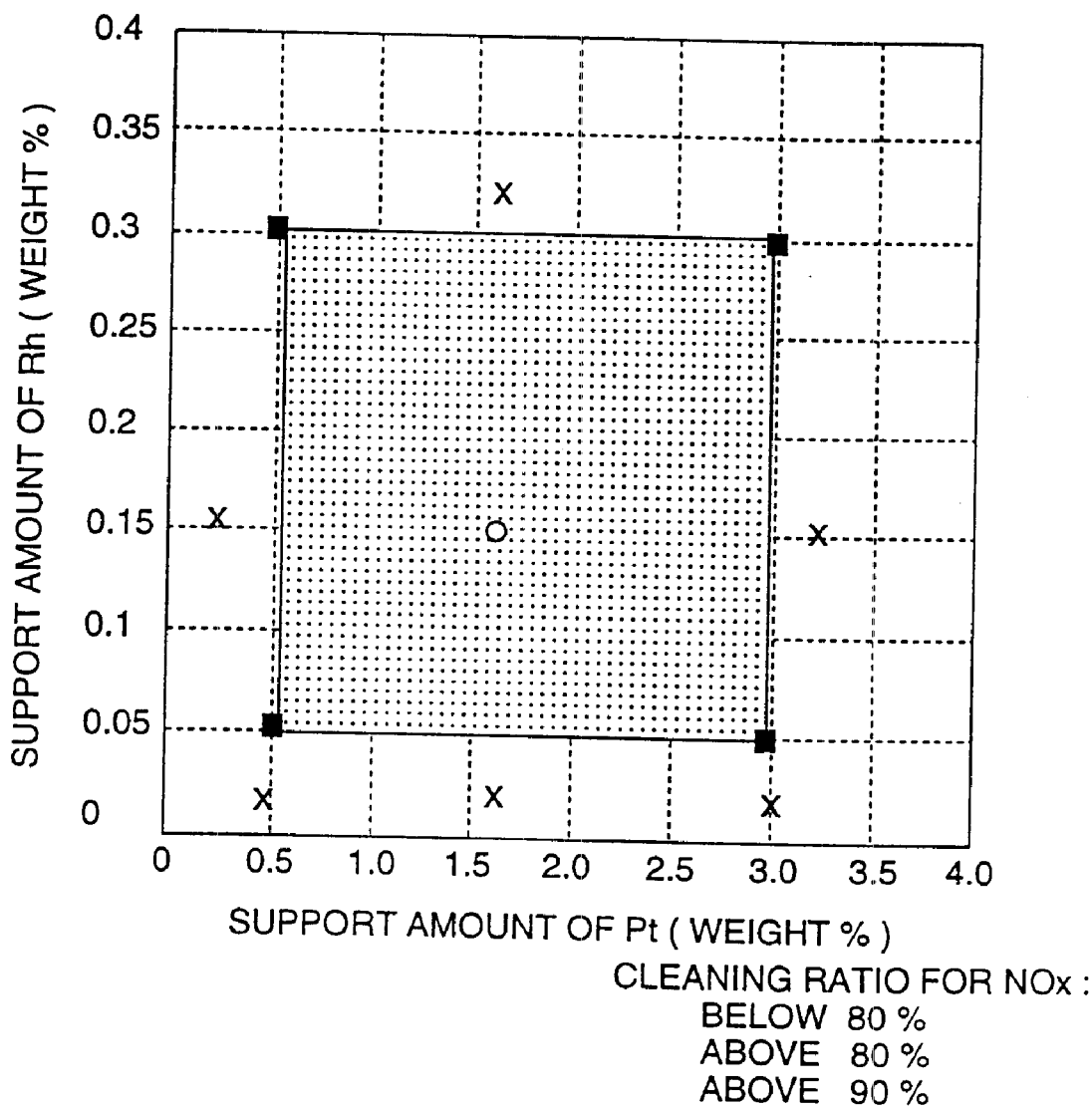
FIG. 5 is a graph showing the correlation between support amounts of Rh, Pt and cleaning ratio for $NO_x$.
Figure 6:
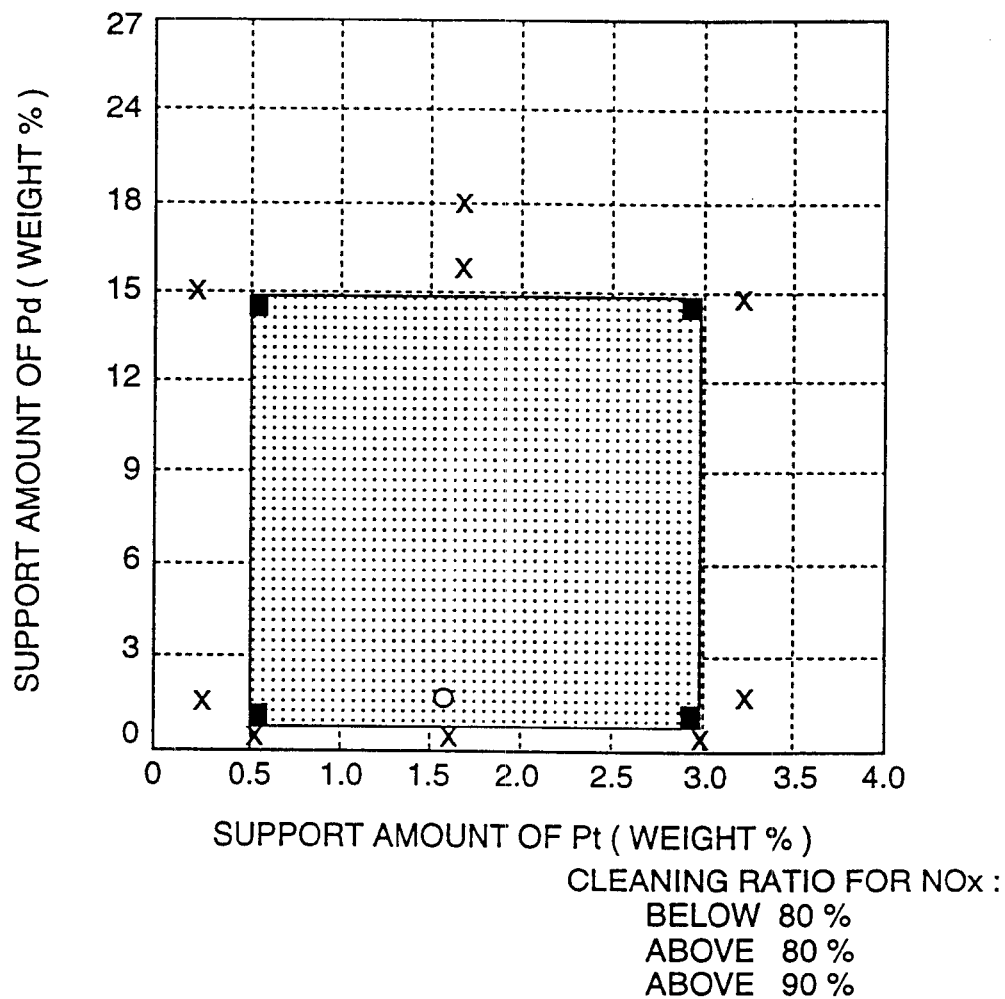
FIG. 6 is a graph showing the correlation between support amounts of Pd, Pt and cleaning ratio for $NO_x$.

An initial performance of $NO_x$ cleaning ratio at 400° C. was measured for catalysts in which support amounts of Pt and Rh were changed in the catalyst of Embodiment 1. The result is shown in FIG. 5. A high $NO_x$ cleaning ratio can be attained by setting the supporting amount of Pt to 0.5 to 3 weight % and the supporting amount of Rh to 0.05 to 0.3 weight %.

An initial performance of $NO_x$ cleaning ratio at 400° C. was measured for catalysts in which support amounts of Pt 5 and Pd were changed in the catalyst of Embodiment 1. The result is shown in FIG. 5. A high $NO_x$ cleaning ratio can be attained by setting the supporting amount of Pt to 0.5 to 3 weight % and the supporting amount of Pd to 0.5 to 15 weight %.

Figure 7:
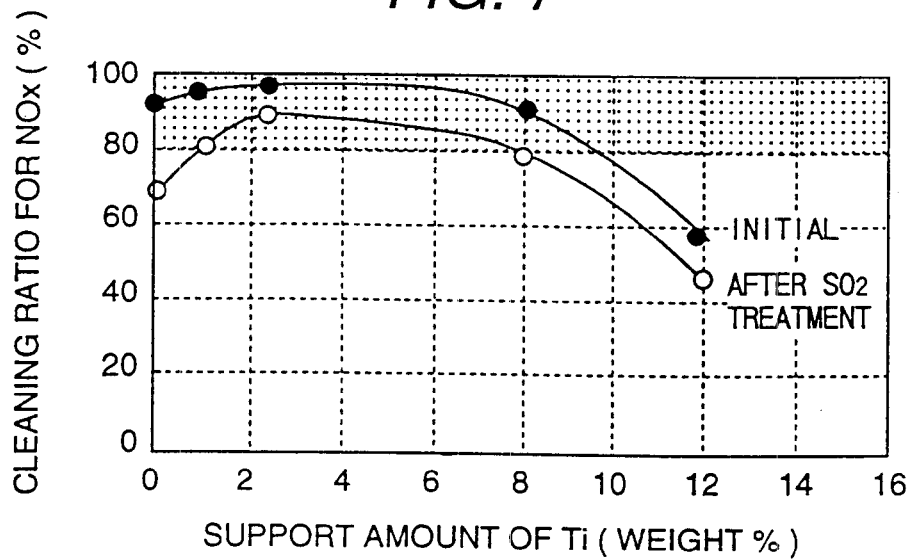
FIG. 7 is a graph showing the relationship between support amount of Ti and cleaning ratio for $NO_x$.

An initial performance of $NO_x$ cleaning ratio and a performance of $NO_x$ 3 cleaning ratio after being poisoned by $SO_x$ were measured at 400° C. for catalysts in which a support amount of Ti of the second component was changed on a base of supporter of 100 weight % in the catalyst of Embodiment 2. The result is shown in FIG. 7. A high $NO_x$ cleaning ratio and high $SO_x$ resistance can be attained by setting the supporting amount of Ti to 1 to 8 weight %.

The catalyst of Embodiment 1 was performed with $SO_2$ treatment through the same method as that in Test Example 1 (3). Next, a performance of $NO_x$ cleaning ratio one minute after starting flowing of the lean model exhaust gas. Then, the catalyst of Embodiment 1 was performed with stoichiometric treatment by flowing the stoichiometric model exhaust gas at 400° C. for 15 minutes described in Test Example 1. After decreasing the temperature to 300° C. the lean model exhaust gas described in Test Example 1 was allowed to flow, and then after one minute an $NO_x$ cleaning ratio was measured. The result is shown in Table 4. The catalyst performance was recovered by the stoichiometric treatment.

TABLE 4

|  | Initial | 3 Hours after $SO_2$ treatment | After stoichiometric treatment |
| --- | --- | --- | --- |
| Catalyst Embodiment 1 | 97% | 89% | 97% |

A performance of $NO_x$ cleaning ratio one minute after switching of flow to the stoichiometric exhaust gas was measured for the catalyst of Embodiment 1 by the method of Test Example 1. The result is shown in Table 5.

TABLE 5

|  | Initial $NO_x$ cleaning ratio [%] | | $NO_x$ cleaning ratio after $SO_2$ poisoning [%] | | $NO_x$ cleaning ratio after 800° C. baking [%] | |
| --- | --- | --- | --- | --- | --- | --- |
|  | 300° C. | 400° C. | 300° C. | 400° C. | 300° C. | 400° C. |
| Catalyst embodiment 1 | 94 | 99 | 95 | 99 | 90 | 98 |

Test Example 2

Using the catalyst of Embodiment 1, HC in a gas ejected out of the reaction tube was measured by FID method though the test method was the same as the method in Test Example 1 from (1) to (3).

Both of stoichiometric model exhaust gas and lean model exhaust gas were used in the same way as those in Test Example 1.

Table 6 shows HC cleaning ratio in one minute after switching from the stoichiometric model exhaust gas to the lean model exhaust gas. The HC cleaning ratio is calculated according to the following equation.

(HC cleaning ratio)=[{(HC concentration in inlet gas)−(HC concentration in outlet gas)}÷(HC concentration in inlet gas)]×100)

The catalyst in accordance with the present invention is effective for HC cleaning as well as cleaning of $NO_x$ in an exhaust gas ejected from an engine.

TABLE 6

|  | Initial HC cleaning ratio [%] | |
| --- | --- | --- |
|  | 300° C. | 400° C. |
| Catalyst of Embodiment 1 | 97 | 97 |

A honeycomb-shaped catalyst 4 cc (17 mm square×14 mm length) of the catalyst of Embodiment 1 and a honeycomb-shaped three way catalyst 2 cc (17 mm square×7 mm length), which was formed by subtracting the second component and the third component from the catalyst of Embodiment 1, were arranged in the reaction tube, and HC cleaning ratio one minute after switching to lean model exhaust gas was measured by the method of Test Example 2. The HC cleaning ratios at both 300° C. and 400° C. were 100%.

According to the present invention, the catalyst can efficiently clean an exhaust gas containing oxygen by removing nitrogen oxide, and the catalyst has heat resistance and resistance to catalyst poisoning substances contained in a small amount in the exhaust gas.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for purifying exhaust from an engine, comprising:
   operating said engine under lean burn conditions; and
   reducing nitrogen oxides in an exhaust gas passage with a catalyst consisting of:
   a porous supporter of inorganic oxides; and
   supporting components consisting of compounds of:
   2.5–27 wt. % of at least one alkali metal,
   1–8 wt. % titanium,
   at least one noble metal selected from the group consisting of 0.05–0.3 wt. % rhodium, 0.5–15 wt. % palladium, and 0.5–3 wt. % platinum, and
   optionally magnesium of 1–40% as a weight ratio of magnesium to said at least one alkali metal and magnesium on a surface of said porous supporter, wherein the weight percent of the supporting components is based upon 100 weight percent of the porous supporter.

2. The method according to claim 1 or 8, further comprising:
   measuring a nitrogen oxide purification rate of said catalyst,
   changing the air-fuel ratio of said engine into a stoichiometric air-fuel ratio condition or rich condition if a measured value of the nitrogen oxide purification rate falls below a set point, and
   changing said air-fuel ratio back to a lean condition.

3. A method for purifying exhaust from an engine comprising:
   operating said engine under lean burn conditions; and
   reducing nitrogen oxides in an exhaust gas passage with a catalyst consisting of:
   a porous supporter of inorganic oxides; and
   supporting components on a surface of said porous supporter, wherein said supporting components are formed by:
   first applying a supporting component of Ce to said porous supporter;
   second applying a supporting component of Mg, Na, and Ti;
   third applying a supporting component of Pt and Rh; and
   fourth applying a supporting component of Mg.

4. The method according to claim 1, wherein said porous supporter is titania.

5. The method according to claim 1, wherein said porous supporter is magnesia.

6. The method according to claim 1, wherein said porous supporter is a multiple oxide of aluminum and lanthanum.

7. The method according to claim 6, wherein said porous supporter contains 1–20 mol % lanthanum.

8. A method for purifying exhaust from an engine comprising:
   operating said engine under lean burn conditions; and
   reducing nitrogen oxides in an exhaust gas passage with a catalyst consisting of:
   a porous supporter of inorganic oxides; and
   supporting components consisting of compounds of:
   2.5–27 wt. % of at least one alkali metal,
   1–8 wt. % of titanium,
   at least one noble metal selected from the group consisting of 0.05–0.3 wt. % rhodium, 0.5–15 wt. % palladium, and 0.5–3 wt. % platinum, and
   5–30 wt. % of at least one rare earth metal, and optionally magnesium of 1–40% as a weight ratio of the magnesium to the at least one alkali metal and magnesium, on a surface of said porous supporter, wherein the weight percent of the rare earth element and optional magnesium is based upon 100 weight percent of the porous supporter.

* * * * *